Aug. 22, 1967  E. G. WENNERSTROM  3,337,181
ADJUSTABLE MANIFOLD FITTING
Filed Dec. 10, 1964  2 Sheets—Sheet 1

INVENTOR.
ERLING G. WENNERSTROM
BY
*Fay & Fay*
ATTORNEYS

INVENTOR.
ERLING G. WENNERSTOM
BY
Fay & Fay
ATTORNEYS

ADJUSTABLE MANIFOLD FITTING
Erling G. Wennerstrom, Mayfield Village, Ohio, assignor to Cajon Company, Solon, Ohio, a corporation of Ohio
Filed Dec. 10, 1964, Ser. No. 417,287
1 Claim. (Cl. 251—148)

This invention relates to tube fittings and more particularly to a manifold fitting which may be interconnected with nonaligned, fixed fluid lines.

Of the many different types of methods available to measure a variable flow, the differential pressure method is frequently used. This method involves the installation of a restriction in the flow line to create an artificial pressure drop and, as is well known, this pressure drop is related to the rate of flow. Differential pressure meters have been designed to make these measurements, with the meters measuring the differential pressure from two different sources or pressure taps in the flow line. In conjunction with the use of such differential pressure meters, bypass manifold arrangements are employed to facilitate the calibration of the meters and for permitting the installation and removal of the instrument from the line. Various types of manifolds have been devised but it is an object of this invention to utilize a manifold composed of components threadedly interconnected. Manifolds such as these are adapted to be connected to the sources of differential fluid pressure and also to the differential pressure measuring meter. It is thus apparent that the manifold is to be connected to two sets of apertures having fixed center-to-center distances. As a result, in the typical installation, it is necessary that four separate connections be made with the consequent problems of alignment. Any misalignment or mismatching will either prevent the connections being made or give rise to a possible leaking joint and thereby render void any measurements which would be made.

This problem is particularly acute where a threaded interconnection between the components comprising the manifold is to be made. Thus, a threaded joint must be threaded to the point where a nonleaking seal between the male and female threads has been achieved. By threading the components until a nonleaking seal has been achieved, there is a distinct possibility that the resulting center-to-center distance between the fluid passages in the manifold may not be the same as the center-to-center distance between the taps on the pressure meter. It is an object of this invention to provide a means whereby this potential misalignment between the pressure taps and the fluid lines may be compensated for and the possibility of any leaking joint thereby obviated.

Thus, it is a primary object of the invention to provide a differential pressure measuring apparatus in which manifolding having a plurality of fluid passages therethrough may be interconnected with a plurality of rigidly spaced apart tubular conduits, with the center distances between the passages in the manifold being readily adjusted to match the center distances between the tubular conduits.

A more specific object of this invention is to provide a manifold composed of two threadedly interconnected components with each component having a fluid passage therethrough adapted to be aligned with and secured to a fixed fluid line.

A still more specific object of the invention is to provide an adjustable manifold which comprises spaced apart body members with means threadedly interconnecting said members, each of said members including a longitudinally extending portion having a substantially radially extending surface at the terminus thereof, a fluid passage through each of said members and said longitudinally extending portion, a groove formed in each of said surfaces concentric to said passages and radially spaced therefrom, resilient seal means in each of said grooves, threads on the exterior of each of said longitudinally extending portions, an adapter associated with each of said members, said adapter comprising a tubular conduit having a radially extending flange at one end thereof, cap means threadably received over said longitudinally extending portion of each of said members, said cap means including a radially inwardly extending flange, said tubular adapter being received within said cap means with a portion thereof extending externally of said cap means through the radially inwardly extending flange, the radially extending flange on each of said adapters being in abutment with said surface on said members whereby said seal means engages said flange to provide a seal between said portion and said adapter, the radial dimension of said flange on said adapter being substantially less than the inner radial dimension of said cap means, and the radially inwardly directed flange on said cap means extending inwardly to a point substantially less than and spaced from the projection portion of said adapter whereby each adapter is shiftable relative to its associated body member and cap means to provide an adjustable center distance between the spaced apart body members.

To the accomplishment of the foregoing and related objects, the following description sets forth in detail one approved means of carrying out the invention. Such disclosed means are not meant to be limiting inasmuch as it constitutes but one of the various ways in which the principles of the invention may be applied.

In the drawings wherein like reference numerals indicate like parts in the various views.

Figure 1:
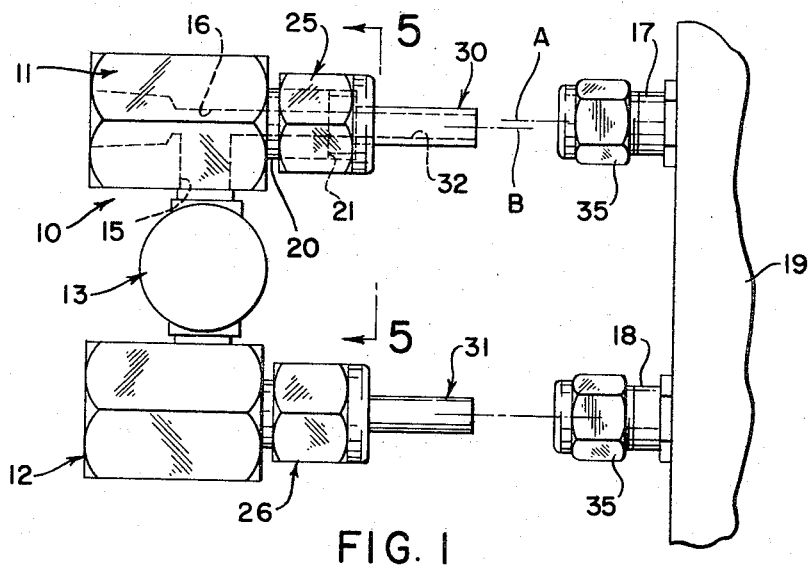
FIG. 1 is a plan view of the manifold fitting illustrating how the fitting is to be used.

Referring now to FIG. 1, a typical adjustable manifold fitting comprising the instant invention is indicated generally by the reference numeral 10. This fitting comprises a first body member 11 and a second spaced body member 12. The members 11 and 12 are interconnected by a member which, in the particular embodiment, is a valve 13. The valve has threaded ends 14 which are threadedly engaged in apertures 15 formed in each of the members 11, 12. The body members 11 and 12 have a fluid passageway 16 extending therethrough and are adapted to be connected to spaced apart tubular conduits such as those illustrated at 17 and 18 in FIG. 1.

The conduits 17, 18 are rigidly mounted in the supporting member 19 so that it is readily apparent that any discrepancy in the mounting of the conduits 17, 18 in the support 19 might well cause misalignment of the conduits with the manifold when it is sought to attach the manifold to the conduit. Another possibility for misalignment between the manifold and the tubular conduits is the threaded interconnection between the members 11, 12. Thus, it is necessary to thread the members so that a fluid-tight connection between the bore 15 and the threaded end 14 is accomplished. In such instances, the spacing between the fluid passageways in the respective members 11, 12 may be varied depending upon the amount of threaded engagement required. In such circumstances, the combination of a manifold having variably spaced fluid passages with a rigidly spaced pair of tubular conduits may pose serious alignment problems.

To assure the alignment of the fluid passageways in the manifold with the tubular conduits, there is provided on each of the body members 11, 12 a longitudinally extending portion 20 through which the fluid passageway 16 extends. This longitudinally extending portion terminates in a radially extending planar surface 21 and includes threads 22 on the external surface thereof. A groove 23 is formed in the surface 21, with the groove being radially spaced from the passage 16 but concentric therewith. Resilient O-ring sealing means 24 is adapted to be received in each of the grooves.

Telescopically and threadably received over the longitudinally extending portion 20 on each of the members are caps 25, 26. The caps have a radially inwardly directed flange portion 27 at one end thereof. The flange 27 terminates short of the center of the cap 25 to provide a passage 28 which communicates with the interior or counterbored portion 29 of the cap and is coaxial with passage 16. Associated with each of the members 11, 12 is a tubular adapter 30, 31. Each of the adapters comprises a tubular member having a fluid passage 32 therethrough. The fluid passage 32 is of substantially the same dimension as the fluid passage 16 through the members 11, 12. The outer diameters of the tubular members 30 and 31 are substantially less than the diameter of the passage 28 through the cap 25, so that the tubular member may freely project therethrough. The axially free end of the flange 33 includes a radially extending planar surface 33a.

Figure 2:
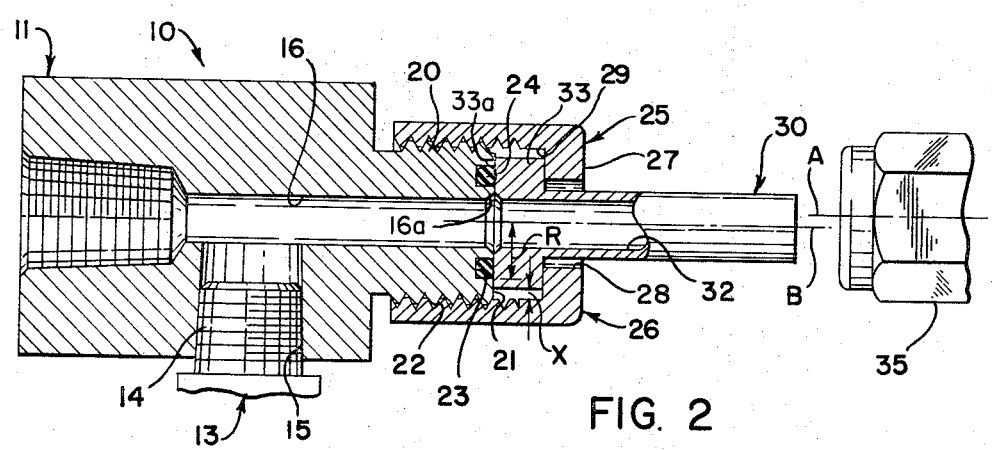
FIG. 2 is a sectional view of one side of the fitting.
Figure 3:
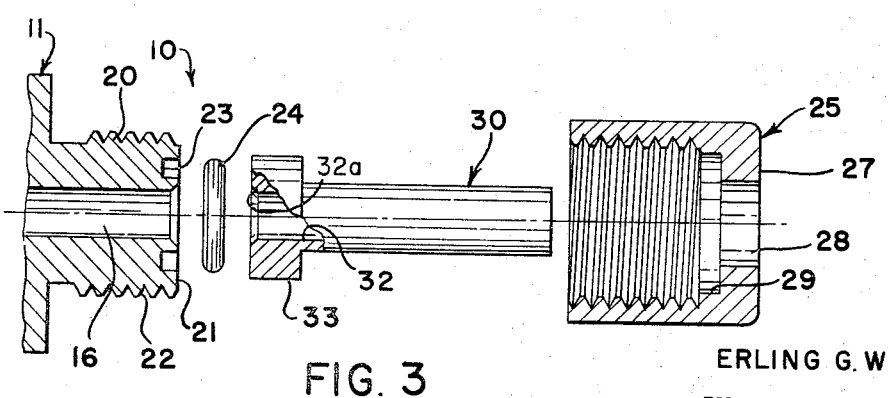
FIG. 3 is an exploded partial sectional view illustrating the components of the fitting which provide the adjustability.

Each of the tubular members includes a radially extending flange 33 on one end thereof which is adapted to be received within the interior 29 of the caps 25, 26. The radial dimension of the flange 33 is substantially less than the diameter of the counterbored interior of the cap 25. Referring to FIG. 2, the tubular adapter 30 is received with the flange 33 clamped between the flange 27 on the cap 25 and the radial surface 21 on the end of the longitudinally extending portion 20. This arrangement permits the tubular portion of the adapter to protrude through the passage 28 in the cap means and the O-ring 24 serves to seal the joint between the flange 33 and the longitudinally extending portion 20. The projecting tubular portion of the adapter is then receivable in the nut 35 on the conduits 17, 18 to effect interconnection therewith.

It is important to note that the spacing between the flanges 33 and the interior of the cap 25 and the spacing between the walls of the passage 28 and the tubular conduit 30 permits radial shifting of the adapter. This is important in the situation such as that illustrated in FIG. 1 and FIG. 2 wherein the center line A of the conduit 17 is not aligned with the center line B of the passage 16 in the member 11. As a result, the tubular adapter 31 of the member 12 may be secured to the conduit 18 but it is, absent some adjustment, impossible to secure the tubular adapter 30 to the conduit 17. However, by virtue of the structural relationships above described, the adapter 30 may be shifted to a position such as that illustrated in FIG. 4 wherein the adapter 30 is in a position of eccentricity in the aperture 28 in the cap means 25. Due to this eccentricity of the adapter 30 the misalignment of the passageway 16 with the conduit 17 may be compensated for thereby permitting securement of the manifold to both conduits. As will be apparent from FIG. 4, to assure full flow of the fluid through the fitting when in the adjusted position, each of the terminating portions of the passages 16 and 32 has a flared mouth portion 16a and 32a respectively which permits full flow despite misalignment.

The amount of spacing permitted between the cap and tubular adapter is unimportant except for the requirement that a spacing be provided around the entire 360° circumference of the cap. Moreover, the spacing must not permit adjustment of the tubular adapter to a position wherein the seal 24 no longer engages the surface 33a on the flange 33 on the adapter thereby permitting leakage. In terms of dimensional interrelationships, thus, the flange 33 must have a diameter exceeding the outer diameter of the O-ring groove plus an amount equal to the amount of permissible shifting available to the adapter in the cap 25. Therefore, if the O-ring is spaced a distance R from the center of the fluid passageway 16 and it is desired that the adapter be shiftable through a distance X, the flange 33 must have a radial dimension which is equal to or greater than R+X. With this relationship, it is apparent that even though the mounting of the conduits 17, 18 in the supporting member 19 may be inaccurate or the threaded connection required to seal the members 11 and 12 to the valve 13 may result in misalignment, it is still possible to connect the manifold fitting to the conduits and have a leaktight interconnection.

Figure 4:
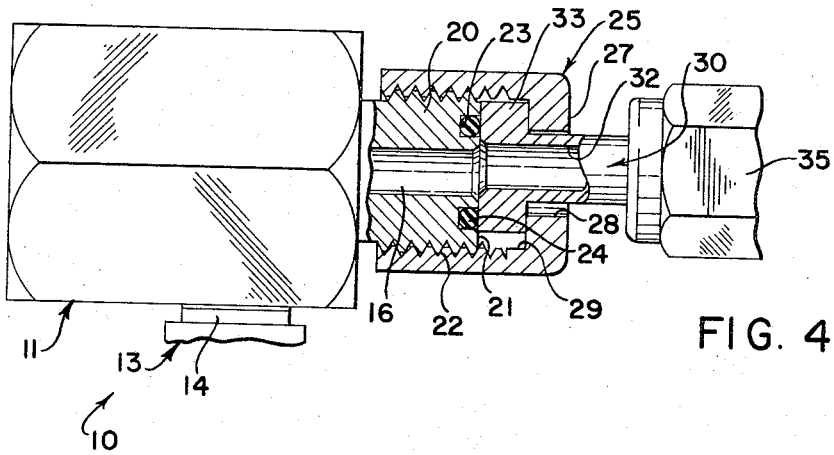
FIG. 4 is a sectional view similar to FIG. 2 showing the adjustment of the fitting.
Figure 5:
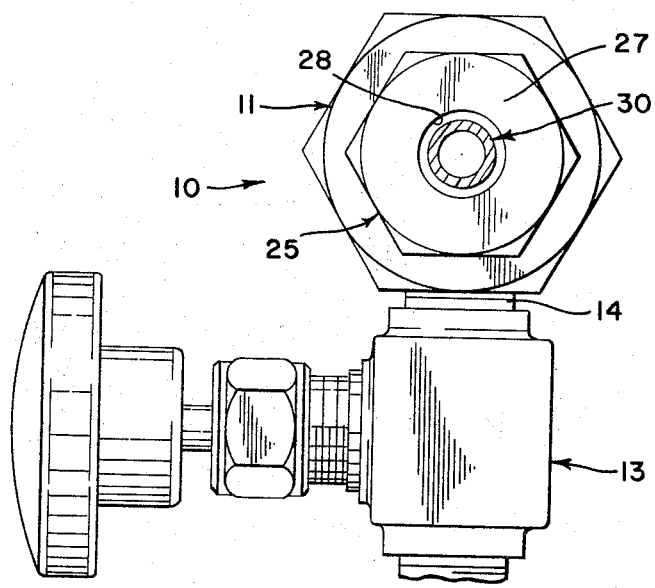
FIG. 5 is a view taken along lines 5—5 of FIG. 1.

To assure that the O-ring is retained in the groove when the adapter is shifted it is desirable to have the flared mouth portions limited in dimension. Thus, as shown in FIG. 4, the flared mouth portions are spaced from the radially inner wall of the O-ring groove a distance no less than the minimum radial spacing of the adapter from the adjacent mating portions of the cap. In this manner, shifting of the adapter as permitted by the cap will not permit the flared mouth portion to shift to a position overlying the O-ring.

Additional modifications and changes will suggest themselves to those having ordinary skill in the art. Changes such as these are contemplated by the principles of this invention so that although for ease of description, the principles of the invention have been set forth in connection with but a single illustrated embodiment, it is not intended that this illustrated embodiment or the terminology employed in describing it is to be limiting, but rather, it is my desire to be restricted only by the scope of the appended claim.

I claim:

An adjustable manifold fitting adapted to be interconnected with a pair of spaced apart apertures having a predetermined center-to-center distance comprising:

a first body member having a fluid passage therethrough;

a second body member spaced from said first body member and having a fluid passage therethrough with said passages in said members being substantially parallel;

each of said body members including a threaded aperture;

said apertures being transverse to and communicating with said fluid passages in said body member;

a valve having oppositely directed threaded ends;

each said end being received in one of said apertures to place the valve in fluid communication with said passages;

each of said body members further including a coupling assembly with the coupling assembly on each body member comprising:

a longitudinally extending externally threaded portion on the body member through which the fluid passage extends;

a planar radially extending surface at the free end of said threaded portion;

a flared mouth formed at the intersection of the fluid passage through the threaded portion and said planar surface;

a groove formed in said planar surface concentric with said passage and radially spaced therefrom and from said flared mouth;

a resilient seal in said groove;

an adapter comprising a tubular conduit portion having a fluid passage therethrough with the fluid passage in said conduit having a diameter substantially equal to the diameter of the passage in the body member;

a flange formed at one end of said conduit portion with said flange including a radially extending planar surface at the axially free end thereof;
a flared mouth at the intersection of the passage through said conduit portion and the planar surface of said flange with said mouth being generally of the same size and configuration as the mouth on the threaded portion of the body member;
cap means having a passage opening through one end thereof;
passage in said cap means having a diameter substantially greater than the outer diameter of the conduit portion of the adapter;
a coaxial threaded counterbored portion opening through the other end of said cap means;
said counterbored portion having a diameter substantially greater than the outer diameter of the flange on the adapter;
a planar radially extending shoulder defined by the juncture of said counterbore and said passage in said cap means;
the diameter of said passage in said cap means being less than the outer diameter of the groove in the body member;
said cap means being received over said adapter with said conduit portion projecting through the passage in said cap means and said flange on said adapter disposed in said counterbored portion of said cap means whereby said adapter may be shifted laterally relative to said cap means;
said cap means being in threaded engagement with the threaded portion on the body member with the passage in said cap means being substantially coaxial with the passage in said body member and said flange on said adapter being clamped between the shoulder in said cap means and said planar surface on said threaded portion whereby said planar surface on said flange is in abutment with the planar surface on said threaded portion;
the outer diameter of the flange on said adapter being at least equal in magnitude to the outer diameter of the groove on the body member plus the minimal radial spacing between said adapter and the adjacent mating portion of said cap means through which said adapter passes;
said flared mouth on the body member being spaced from the radially inner wall of the groove a distance no less than the minimum radial spacing between the adapter and the adjacent mating portion of said cap means.

References Cited

UNITED STATES PATENTS

| | | | |
|---|---|---|---|
| 2,273,395 | 2/1942 | Couty | 285—354 X |
| 2,458,817 | 1/1949 | Wolfram | 285—354 X |
| 2,590,947 | 4/1952 | Denis | 285—30 X |

FOREIGN PATENTS 820,113  9/1959  Canada.

CARL W. TOMLIN, *Primary Examiner.*

DAVE W. AROLA, *Examiner.*

J. L. KOHNEN, *Assistant Examiner.*